United States Patent [19]

Yasuhiro

[11] Patent Number: 5,435,265
[45] Date of Patent: Jul. 25, 1995

[54] BREEDING CAGE OF SMALL ANIMAL

[75] Inventor: Takimoto Yasuhiro, Higashi-Osaka, Japan

[73] Assignee: Kujaku Kana-Ami Co., Ltd., Osaka, Japan

[21] Appl. No.: 195,472

[22] Filed: Feb. 14, 1994

[30] Foreign Application Priority Data

Feb. 12, 1993 [JP] Japan .................. 5-009605 U

[51] Int. Cl.⁶ .................................. A01K 31/06
[52] U.S. Cl. ........................................ 119/17
[58] Field of Search ................................ 119/17

[56] References Cited

U.S. PATENT DOCUMENTS 1,539,583  5/1925  Lindemann ..................... 119/17

FOREIGN PATENT DOCUMENTS 19407  10/1894  United Kingdom ............. 119/17
515179  11/1939  United Kingdom ............. 119/17

*Primary Examiner*—Robert P. Swiatek
*Attorney, Agent, or Firm*—Wenderoth, Lind & Ponack

[57] ABSTRACT

A breeding cage which does not require separate members for connecting frames of a trunk portion of the cage together, which is easy to handle, and which has an appointed cylindrical shape that hardly changes when the frames are connected together. The frames are formed by fixedly mounting crossing members to one side of a plurality of parallel horizontal members made of metallic wires. The frames are connected at respective end portions thereof along a line extending axially of the cylindrical trunk portion. A plurality of connecting wires intersect the horizontal members at substantially right angles and are fixedly mounted to the horizontal members at one of the end portions where the frames are connected to each other. A plurality of wire portions extend from the horizontal members at the other of the end portions. The wire portions overlap the respective connecting wires. Specifically, the wire portions extend between the connecting wires and overlie opposite sides of the connecting wires. The wire portions each include a bent portion, which is engaged with one of the connecting wires to prevent the connecting wire from separating from the wire portion.

4 Claims, 4 Drawing Sheets

BREEDING CAGE OF SMALL ANIMAL

BACKGROUND OF THE INVENTION

1. Field of the Invention

The present invention relates to a breeding cage for use in breading small animals such as birds, squirrels and the like.

2. Description of the Prior Art

A cage for use in breeding birds, squirrels and other small animals is disclosed in Japanese Utility Model Application No. Sho 51-54550. This cage comprises a cylindrical trunk portion of an open framework, a bottom mounted on one end of the trunk portion and an upper cover mounted on the other end of the trunk portion. In this breeding cage as shown in FIGS. 7 and 8, vertical wires 22 are fixedly mounted on a plurality of horizontal members 21, which are arranged in parallel to form frames 23, 23. Respective end portions of the frames 23, 23 are connected with each other to form the cylindrical trunk portion 24. Specifically, vertical connecting wires 25, 25 adjacent to each other at the respective end portions of the frames 23, 23 are connected with each other through connecting members 26 made of synthetic resin. The connecting members 26 have a concave configuration. Respective supporting portions 27, 27 of the connecting members 26 are provided with supporting holes 28, 28 and V-shaped guide grooves 29, 29 communicating with the respective supporting holes 28, 28, as shown in FIG. 8. The connection of the adjacent vertical connecting wires 25, 25 with the connecting members 26 is achieved by inserting the respective vertical connecting wires 25, 15 into the supporting holes 28, 28 through the guide grooves 29, 29 which is facilitated by the ability of the supporting portions 27, 27 to slightly elastically deform.

In the above-described conventional breeding cage, the frames 23, 23 are connected to each other, with the connecting members 26, at the respective end portions thereof to form the cylindrical trunk portion 24. Accordingly, the cylindrical trunk portion 24 can be divided into a plurality of parts and thus transported, packed and otherwise handled easily. However, since the frames 23, 23 and the connecting members 26 are discrete members, various kinds of problems occur. For example, when the frame 23, 23 and other members required for assembling the breeding cage are collectedly packed, it is necessary to attach a required number of comparatively small connecting members 26 to the frames. It takes time to attach the connecting members 26, the wrong number of connecting members 26 are attached, or an assembler may forget to attach the connecting members in which case the breeding cage cannot be assembled. In addition, in the case where the assembled trunk portion 24 consists of two frames 23, 23, the frames 23, 23 are pivotably supported by the connecting members 26, respectively. The assembled trunk portion 24 is thus not quite cylindrical, whereby it becomes difficult to mount the bottom cover and the upper cover to the assembled trunk portion 24.

SUMMARY OF THE INVENTION

An object of the present invention is to solve the abovedescribed problems by providing a breeding cage in which separate members for connecting the frames are not required, which can be handled easily, and in which the desired cylindrical shape of the trunk portion hardly changes when the cylindrical trunk portion is formed by connecting the ends of the frames together.

The frames are formed by fixedly mounting crossing members on one side of a plurality of horizontal members made of metallic wires disposed in parallel. The frames are connected at respective end portions thereof along a line extending axially of the cylindrical trunk portion. A plurality of connecting wires intersect the horizontal members at substantially right angles and are fixedly mounted to the horizontal members at one of the end portions where the frames are connected to each other. A plurality of wire portions extend from the horizontal members at the other of the end portions. The wire portions overlap the respective connecting wires. Specifically, the wire portions extend between the connecting wires and overlie opposite sides of the connecting wires. The wire portions each include a bent portion, which is engaged with one of the connecting wires to prevent the connecting wire from separating from the wire portion.

The crossing members can be mounted to an inner side or an outer side of the horizontal members. In addition, any number of the connecting wires can be fixed to the end portions of the frames and the connecting wires can have various sectional shapes, that is circular or square sectional shapes. The bent portions of the wire portions can have basically any shape, for example arched or stepped, as long as the shape facilitates their engagement with the connecting wires. The crossing members can be made from wire or other materials. In the case where the crossing members are made of wire, the crossing members may intersect the horizontal members at right angles or obliquely relative to the horizontal members.

In the breeding cage according to the present invention, in order to connect the end portions of the frames to each other to form the trunk portion, the wire portions at one end portion of the frames are engaged with a plurality of connecting wires provided at the other end portion. In order to provide this engagement between the wire portions and the connecting wires, the wire portions are inserted between a plurality of connecting wires to overlie one side of one (or some) of the connecting wires and the other (opposite) side of the other connecting wire(s), respectively, whereby the wire portions are supported at both sides thereof by means of a plurality of the connecting wires. Further, the bent portion of the wire is engaged with one of the connecting wires, whereby the wire portion is detachably connected to the plurality of connecting wires. Because the wire portion, which projects at one end of a frame, is supported at both sides thereof by a plurality of the connecting wires, the respective frames are fixedly connected to each other in a manner that maintains the appointed shape of the trunk portion. And, because the wire portions are integral parts of the horizontal members, time can be saved in packing, handling, etc. the parts of the cage.

DETAILED DESCRIPTION OF THE PREFERRED EMBODIMENTS

Figure 1:
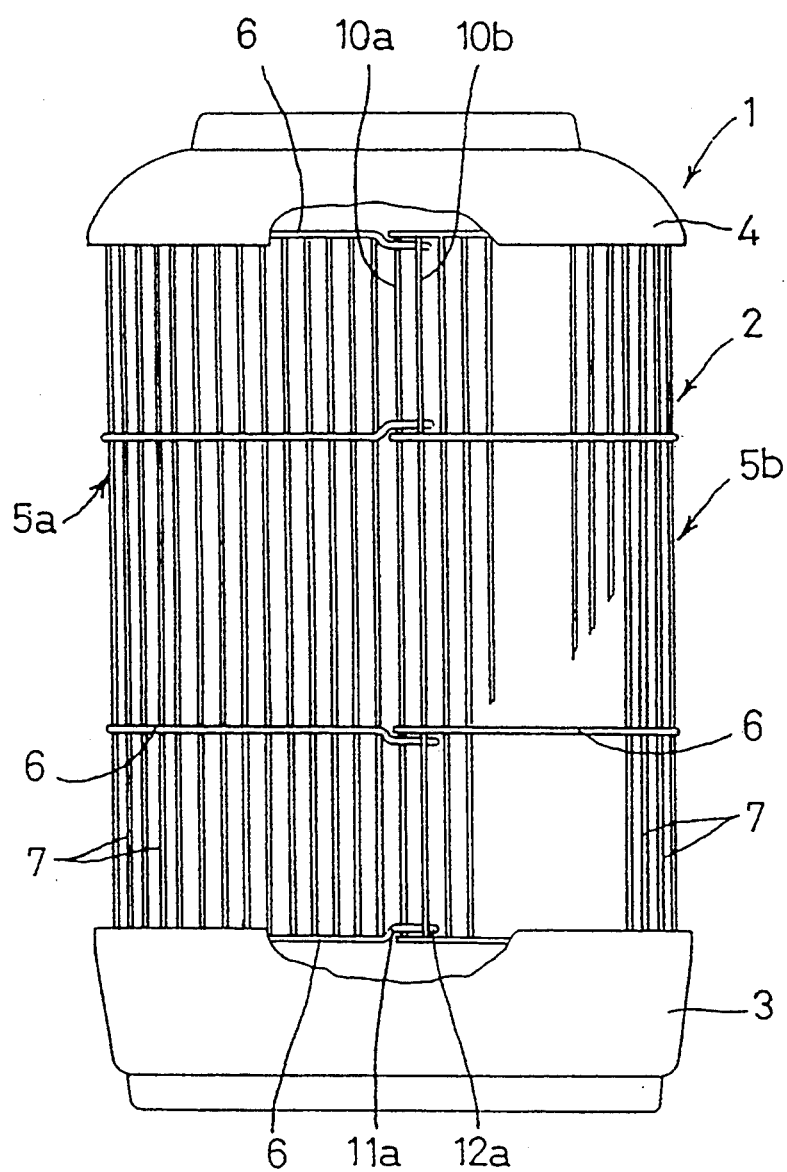
FIG. 1 is a partially broken-away front view of a first preferred embodiment of a breeding cage according to the present invention.
Figure 2:
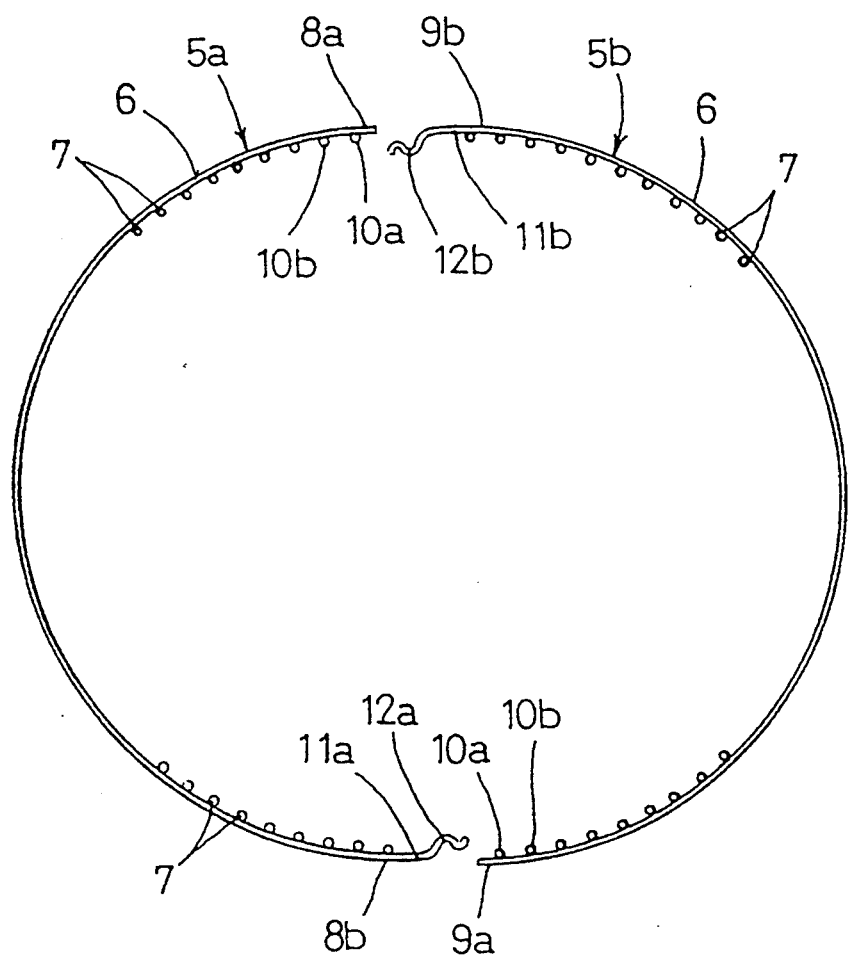
FIG. 2 is a plan view of a framework of the first preferred embodiment.
Figure 3:
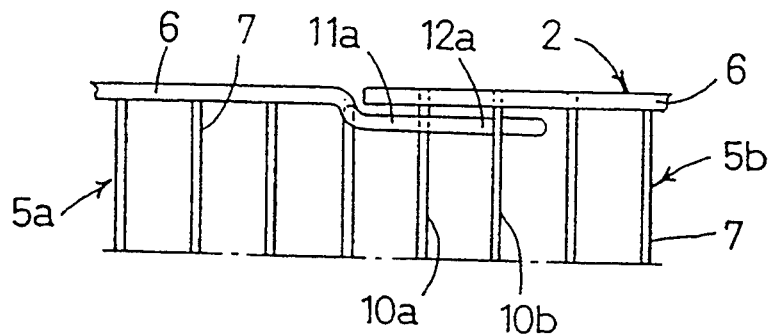
FIG. 3 is an enlarged front view of a principal part of the framework of the first preferred embodiment.

The first preferred embodiment of a breeding cage according to the present invention will be described below with reference to FIGS. 1 to 4. Referring to FIGS. 1 to 4, reference numeral 1 designates a breeding cage comprising a cylindrical trunk portion 2, a bottom 3 mounted to a lower end of the trunk portion 2 and an upper cover 4 mounted to an upper end of the trunk portion 2. The trunk portion 2 is provided with a gateway for the animals and a port for receiving a receptacle containing food and the like, although they are not shown. Reference numerals 5a, 5b designate semicylindrical frames constituting the trunk portion 2 (refer to FIG. 2) and comprising a plurality of horizontal members 6 of metallic wires arranged in parallel and crossing members 7 made of metallic wires and fixedly mounted on the respective inner sides of the horizontal members 6 in parallel and at intervals appropriate for the breeding cage. The crossing members 7 are mounted over nearly the entire length of the horizontal members 6, and the crossing members 7 intersect the horizontal members 6 at right angles so that the frames 5a, 5b have a net-like shape. Reference numerals 8a, 8b, 9a, 9b designate respective end portions of the frames 5a, 5b, reference numerals 10a, 10b designate connecting wires fixedly mounted on the respective horizontal members 6 at the end portions 8a, 9a of the frames 5a, 5b and intersecting the respective horizontal members 6 at right angles, and reference numerals 11a, 11b designate connecting wire portions extending from the respective horizontal members 6 at the end portions 8b, 9b of the frames 5a, 5b. The wire portions 11a, 11b have bent portions 12a, 12b to be engaged with the connecting wires 10b. These bent portions 12a, 12b are formed by bending the respective front ends of the wire portions 11a, 11b in an arch-like shape to the inside of the trunk portion 2.

Figure 4:
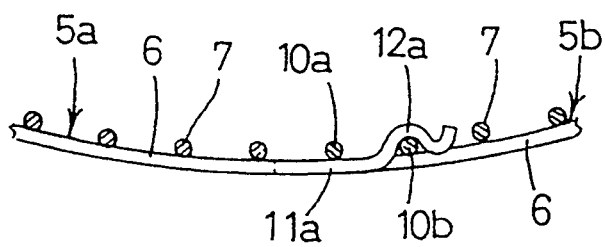
FIG. 4 is an enlarged plan view of the principal part of the framework of the first preferred embodiment.

In order to construct the trunk portion 2 by connecting the semicylindrical frames 5a, 5b to each other, the connecting wire portion 11a of the frame 5a is inserted between the connecting wires 10a, 10b of the frame 5b from the outer side to the inner side of the frame 5b, as shown in FIG. 4. Thus, a base portion of the connecting wire 11a overlies the outer side of the connecting wire 10a and a free end portion of the connecting wire 11a overlies the inner side of the connecting wire 10b, whereby the connecting wire 11a is supported at both sides thereof by means of the connecting wires 10a, 10b with the connecting wire material 10b being received in the arch-like engaging bent portion 12a. Accordingly, engaging bent portion 12a is engaged with the connecting wire 10b, thereby connecting the connecting wire 10b with the connecting wire 11a. Similarly, the connecting wire 11b is inserted between the connecting wires 10a, 10b of the frame 5a and the engaging bent portion 12b is engaged with the connecting wire 10b.

Thus, the frames 5a, 5b are connected to each other at the end portions 8a, 8b, 9a, 9b thereof to form the cylindrical trunk portion 2.

In order to knock down the cylindrical trunk portion 2, the respective end portions 8a, 8b, 9a, 9b of the frames 5a, 5b are pulled in a direction to separate the engaging bent portions 12a, 12b from the respective connecting wires material 10b. Accordingly, the bottom 3 and the upper cover 4 can be separated from the trunk portion 2 and the frames 5a, 5b can be separated from each other to reduce the overall size of the breeding cage when the breeding cage is not being used.

And, because the connecting wires 11a, 11b are integral with the respective horizontal members 6, there is no possibility of such parts being lost. In addition, since the connecting wires 10a, 10b and the wire portions 11a, 11b are elastically deformable, the wire portions 11a, 11b can be easily inserted between the connecting wires 10a, 10b. Moreover, the wire portions 11a, 11b are fixed relative to the connecting wires 10a, 10b to maintain the cylindrical shape of the trunk portion 2 so that the bottom 3 and the upper cover 4 can be easily mounted to the trunk portion 2.

Further, although the trunk portion 2 is cylindrical and the frames 5a, 5b are semicylindrical in the above-described first preferred embodiment, the trunk portion 2 may have other sectional shapes. That is, the trunk portion 2 may have polygonal sectional shapes or a square sectional shape, and the sectional shape of the respective frames is set in dependence upon the sectional shape of the trunk portion. Also, the number of frames constituting the trunk portion can be greater than that (two) in the first preferred embodiment. Furthermore, the frames 5a, 5b of the first preferred embodiment can be integrally formed with the only end portion of one of the frames being connected to the only end portion of the other frame by the connecting wires. If the trunk portion has a polygonal or square sectional shape, the frames are connected, for example, at corner portions of the trunk portion or at midpoints of the respective sides thereof. In addition, the wire portions project at the end portions of the frames in directions that depend upon the positions where the trunk portion is divided. That is, the wire portions project, for example, along the surfaces of the frames or at an angle relative to the surfaces of the frames. Although the connecting wires 10a, 10b are each formed of one metallic wire in the first preferred embodiment, at least one of them may comprise a plurality of metallic wires. In addition, although the connecting wires 10a, 10b each have a round sectional shape in the first preferred embodiment, they may have a flat sectional shape.

Figure 5:
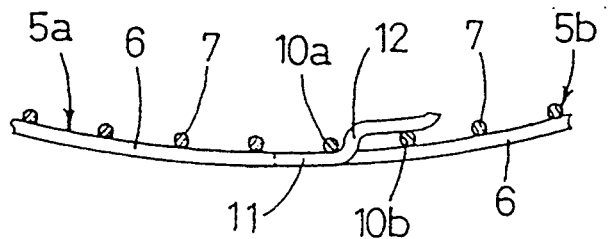
FIG. 5 is a similar view of a second preferred embodiment.

FIG. 5 shows the second preferred embodiment which is characterized by the shape of the wire portions projecting at the end portions of the frames. Referring to FIG. 5, reference numerals 5a, 5b designate frames. Reference numeral 11 designates a wire portion extending from an end portion of horizontal member 6 of frame 5a and provided with a bent portion 12 having a step, extending to the inside of the cage, at the midpoint of the bent portion. The remaining elements are the same as those in the above-described first preferred embodiment and thus, are designated by the same reference numerals as in the first preferred embodiment. In order to connect the wire portions 11 with the connecting wires 10a, 10b, the wire portions 11 are inserted between the connecting wires 10a, 10b of the frame 5b, from the outer side to the inner side of the frame 5b.

Thus, a base of the wire portion 11 overlies an outer side of the connecting wire 10a and a free end of the wire portion overlies an inner side of connecting wire 10b so that the stepped engaging bent portion 12 engages the connecting wire 10a and the connecting wire 10b at opposite sides thereof. Accordingly, the connecting wire portion 11 is supported a both sides thereof by means of the connecting wires 10a, 10b to connect the frames 5a, 5b to each other in a manner that prevents the frames 5a, 5b from separating from each other.

Figure 6:
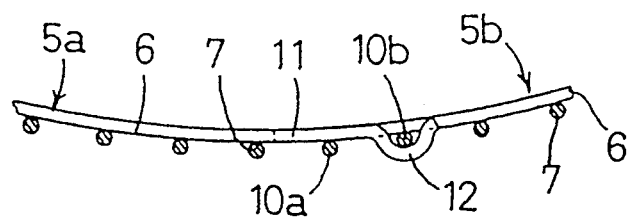
FIG. 6 is a similar view of a third preferred embodiment.
Figure 7:
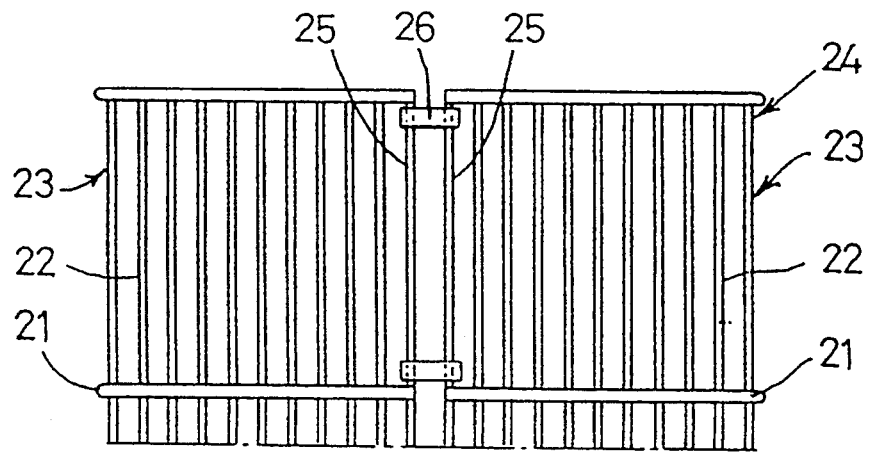
FIG. 7 is a front view of the parts of the framework of the conventional breeding cage.
Figure 8:
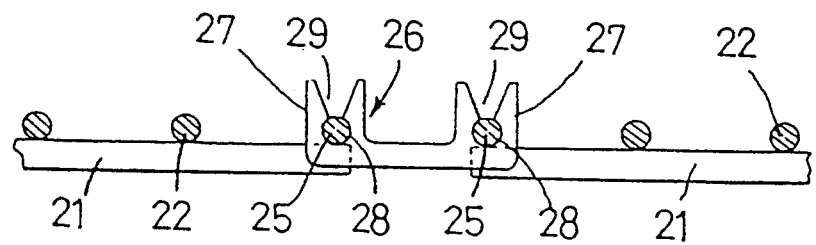
FIG. 8 is an enlarged plan view of principal parts of the framework of the conventional breeding cage.

FIG. 6 shows the third preferred embodiment. According to the third preferred embodiment, the crossing members 7 and the connecting wires 10a, 10b are fixedly mounted on outer surfaces of the horizontal members 6, respectively. The wire portion 11 is provided with an arched bent portion 12 at a free (front) end thereof which is to engage the outer side of the connecting wire 10b. In order to connect the wire portions 11 with the connecting wires 10a, 10b, each of the wire portions 11 is inserted between the connecting wires 10a, 10b of the frames 5b in a direction from the inside to the outer side of the frame 5b. Thus, the base of the connecting wire 11 overlies the inner side of the connecting wire 10a and the arched bent portion 12 engages the outer side of the connecting wire 10b. Further, the stepped bent portion of the above-described second preferred embodiment can be used in place of the arched bent portion 12.

In the breeding cage according to the present invention, the wire portions projecting at one end portion of the frames are inserted between a plurality of connecting wires mounted at the other end portion of the frames, whereby the wire portions are supported at both sides thereof by the respective connecting wires. Further, the bent portion of the wire portion is engaged with one of the connecting wires to prevent the connecting wire from separating from the wire portion. The cylindrical trunk portion is formed by connecting the end portions of the frames to each other in this manner. In addition, the wire portions are integral with the horizontal members, and are in fact unitary extensions of the horizontal members. Accordingly, no dedicated time is required for handling the wire portions and there is little possibility of such parts becoming lost. In addition, because the wire portions are unitary parts of the frames, the frames can be readily connected to each other with the wire portions. Moreover, because the wire portions are supported at both sides thereof by means of a plurality of connecting wires, the frames are prevented from deforming at these locations and thus, the appointed cylindrical shape of the trunk portion is maintained. Accordingly, the bottom and the upper cover can be easily mounted to the trunk portion.

I claim:

1. A cage for small animals comprising: a trunk portion having a closed sectional shape and open ends, said trunk portion comprising a plurality of frames having end portions connected to each other along a line extending axially of said trunk portion, each of said frames including a plurality of horizontal members of metallic wires extending parallel to each other and a plurality of crossing members mounted to said horizontal members, said frames including a plurality of connecting wires intersecting said horizontal members of one of said frames at substantially right angles and fixed thereto at one of the end portions where said frames are connected to each other, said frames also including a plurality of wire portions extending from said horizontal members of the other of said frames at the other of said end portions where said frames are connected to each other, each of said wire portions extending between said connecting wires and overlying one of said connecting wires at one side thereof and the other of said connecting wires at a side thereof opposite said one side, and each of said wire portions have a bent portion engaged with one of said connecting wires to thereby detachably secure the frames to each other; a bottom disposed over one of the open ends of the trunk portion; and a top disposed over the other of the open ends of the trunk portion.

2. A cage for small animals as claimed in claim 1, wherein the bent portion of each of said wire portions is arched and is disposed to the inside of the connecting wire engaged therewith.

3. A cage for small animals as claimed in claim 1, wherein each of said wire portions has a base from which the wire portion extends from the horizontal member, and a step constituting the bent portion of the wire portion, the step extending to the inside of the cage from said base.

4. A cage for small animals as claimed in claim 1, wherein the bent portion of each of said wire portions is arched and is disposed to the outside of the connecting wire engaged therewith.

* * * * *